(12) United States Patent
Brandt

(10) Patent No.: US 10,740,026 B2
(45) Date of Patent: Aug. 11, 2020

(54) TIME INDICATOR OF SUPER BLOCK OPERATIONS

(71) Applicant: Micron Technology, Inc., Boise, ID (US)

(72) Inventor: Kevin R. Brandt, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 203 days.

(21) Appl. No.: 15/984,103

(22) Filed: May 18, 2018

(65) Prior Publication Data
US 2019/0354309 A1 Nov. 21, 2019

(51) Int. Cl.
*G06F 11/34* (2006.01)
*G06F 3/06* (2006.01)

(52) U.S. Cl.
CPC .......... *G06F 3/0653* (2013.01); *G06F 3/0604* (2013.01); *G06F 3/0652* (2013.01); *G06F 3/0659* (2013.01); *G06F 3/0673* (2013.01)

(58) Field of Classification Search
CPC ... G06F 11/079; G06F 11/3037; G06F 3/0653
USPC ........................................................ 714/6.11
See application file for complete search history.

(56) References Cited

U.S. PATENT DOCUMENTS

| | | | |
|---|---|---|---|
| 8,751,731 B2 | 6/2014 | Asnaashari et al. | |
| 9,239,781 B2 | 1/2016 | Jones et al. | |
| 2012/0303931 A1* | 11/2012 | Asnaashari | G06F 12/0246 711/209 |
| 2013/0051144 A1* | 2/2013 | Suzuki | G06F 3/0616 365/185.11 |
| 2013/0111299 A1* | 5/2013 | Hashimoto | G06F 11/1068 714/758 |
| 2014/0181595 A1* | 6/2014 | Hoang | G06F 11/3034 714/47.3 |
| 2014/0237168 A1 | 8/2014 | Prins et al. | |
| 2014/0281260 A1* | 9/2014 | Peterson | G06F 3/0616 711/135 |
| 2016/0170871 A1* | 6/2016 | Hyun | G06F 3/0679 711/103 |
| 2016/0180952 A1 | 6/2016 | Darragh et al. | |
| 2016/0180959 A1 | 6/2016 | Darragh et al. | |
| 2016/0320973 A1 | 11/2016 | Yeh | |
| 2017/0047124 A1* | 2/2017 | Ellis | G11C 16/10 |
| 2017/0131947 A1* | 5/2017 | Hoang | G06F 11/3452 |
| 2017/0131948 A1* | 5/2017 | Hoang | G06F 3/0653 |
| 2017/0277448 A1 | 9/2017 | Khoueir et al. | |
| 2017/0285948 A1 | 10/2017 | Thomas et al. | |

(Continued)

FOREIGN PATENT DOCUMENTS

WO 2015102894 A1 7/2015

OTHER PUBLICATIONS

International Search Report and Written Opinion from related international application No. PCT/US2019/032650, dated Sep. 9, 2019, 12 pages.

(Continued)

*Primary Examiner* — Chae M Ko
(74) *Attorney, Agent, or Firm* — Brooks, Cameron & Huebsch, PLLC

(57) ABSTRACT

Recording an indicator of time at which a super block is erased, recording an indicator of time at which a first page of the super block is programmed, and recording an indicator of time at which a last page of the super block is programmed.

20 Claims, 5 Drawing Sheets

(56) References Cited

U.S. PATENT DOCUMENTS

2017/0337212 A1* 11/2017 Hayasaka ............... G06F 3/061
2018/0143882 A1*  5/2018 Dodge ................ G06F 11/1471
2019/0171381 A1*  6/2019 Ioannou ................ G06F 3/0679
2019/0189239 A1*  6/2019 Suzuki ................ G06F 11/1048

OTHER PUBLICATIONS

"Apacer SSDWidget real-time monitoring software beyond S.M.A.R.T.", <https://rutronik-tec.com/apacer-ssdwidget-real-time-monitoring-software-beyond-s-m-a-r-t>, Aug. 23, 2017, 6 pages (See p. 1).

\* cited by examiner

| 404 | 442 | 444 | 446 |
|---|---|---|---|
| SUPER BLOCK | ERASED | FIRST PAGE PROGRAMMED | LAST PAGE PROGRAMMED |
| SUPER BLOCK 0 | ERASE INDICATOR 448-1 | FIRST PAGE PROGRAM INDICATOR 450-1 | LAST PAGE PROGRAM INDICATOR 452-1 |
| SUPER BLOCK 1 | ERASE INDICATOR 448-2 | FIRST PAGE PROGRAM INDICATOR 450-2 | LAST PAGE PROGRAM INDICATOR 452-2 |
| SUPER BLOCK N | ERASE INDICATOR 448-W | FIRST PAGE PROGRAM INDICATOR 450-X | LAST PAGE PROGRAM INDICATOR 452-Y |

US 10,740,026 B2

TIME INDICATOR OF SUPER BLOCK OPERATIONS

TECHNICAL FIELD

The present disclosure relates generally to a memory system, and, more particularly, to recording time at which super blocks are erased and programmed.

BACKGROUND

A memory system can be a storage system, such as a solid-state drive (SSD), and can include one or more memory components that store data. For example, a memory system can include memory devices such as non-volatile memory devices and volatile memory devices. In general, a host system can utilize a memory system to store data at the memory devices of the memory system and to retrieve data stored at the memory system.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
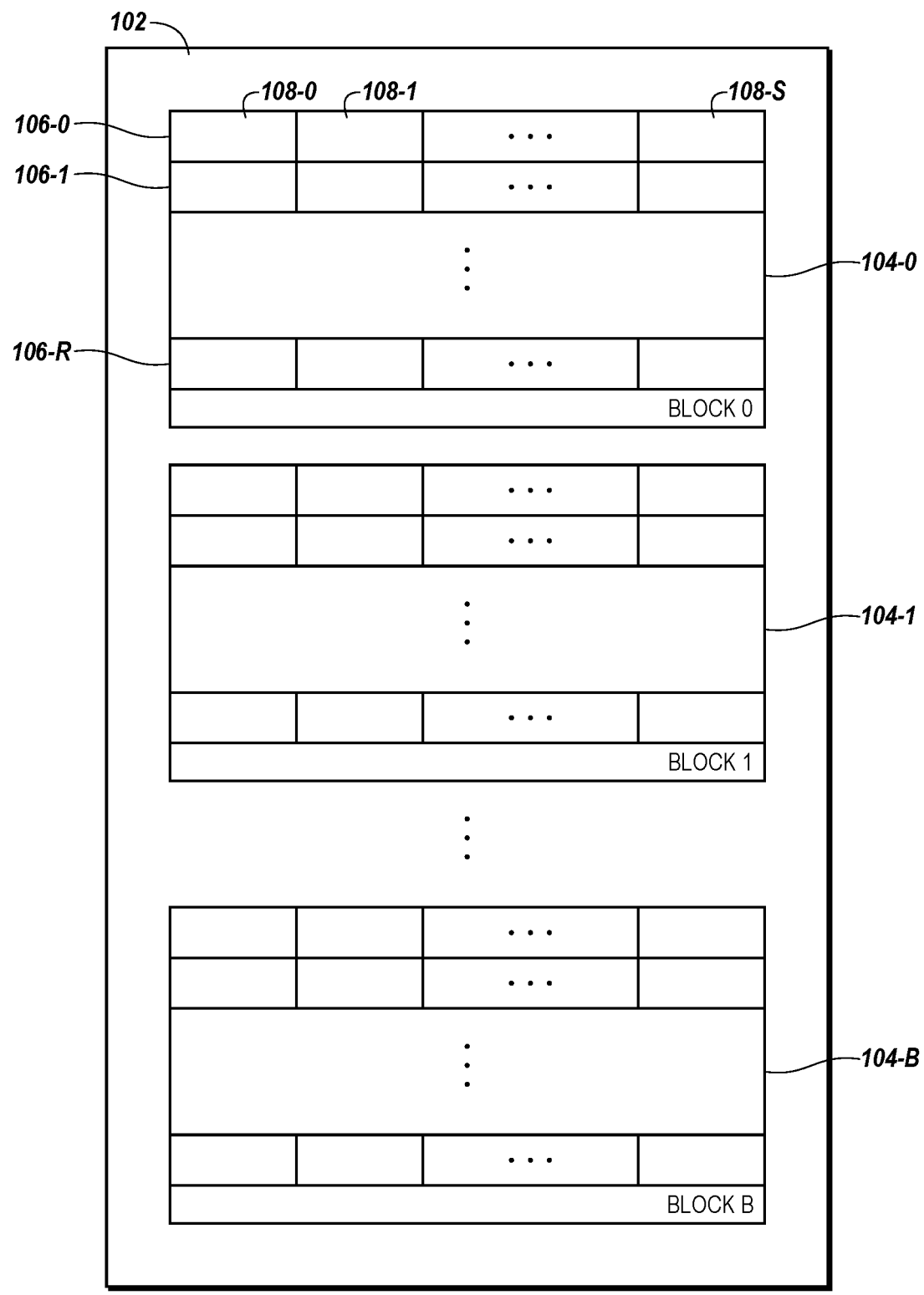
FIG. 1 is a diagram of a memory array that includes multiple physical blocks and can be operated in accordance with one or more embodiments of the present disclosure.

Aspects of the present disclosure are directed to recording time at which super blocks are erased and programmed for failure analysis and/or for adjusting trim settings in a memory device in a memory system. The memory system can be a storage system, such as a solid-state drive (SSD). In some embodiments, the memory system is a hybrid memory/storage system. In general, a host system can utilize a memory system that includes one or more memory devices. The memory devices can include non-volatile memory devices, such as, for example, negative- and (NAND). The host system can provide write requests to store data at the memory devices of the memory system and can provide read requests to retrieve data stored at the memory system.

Memory systems are capable of recording time at which super blocks are erased and programmed in block information tables (BIT). Time information in a BIT can be used during a failure analysis of a memory device to calculate how long a super block was in an erased state before being programmed and how long a super block was in a programmed state before failing. Time information in a BIT can also be used to adjust trim settings of a memory device to prevent errors. With conventional memory systems, time at which super blocks are erased and programmed are not recorded, which can result in less informative failure analysis and data corruption and/or data loss.

Aspects of the present disclosure address the above and other deficiencies by recording time at which super blocks are erased and programmed in a BIT. Embodiments of the present disclosure include recording an indicator of time at which a super block is erased, recording an indicator of time at which a first page of the super block is programmed, and recording an indicator of time at which a last page of the super block is programmed. The indicator of time can include a power on hour (POH), power on cycle, and/or real time at which the super block is erased, the first page of the super block is programmed, and the last page of the super block is programmed. In some examples, the indicator of time can be recorded as a two hour POH. To save space in the memory system, the indicator of time can be recorded every two hours instead of, for example, every hour. For example, if the POH was recorded at 5 the super block was erased between 10 and 12. The indicator of time at which the super block is erased, the first page of the super block is programmed, and the last page of the super block is programmed can be used for failure analysis and/or for adjusting trim settings.

The failure analysis can include calculating how long the super block was in an erased state before being programmed. The failure analysis can also include calculating how long the super block was in a programmed state before failing.

Adjusting trim settings can include adjusting background scans. The frequency of background scans can be increased and/or decreased, in response to one or more of the indicators of time, for example. Adjusting trim settings can also include erasing a portion of the memory array before writing to the portion of the memory array, in response to one or more of the indicators of time. The one or more indicators of time can also be used to predict where signals of a super block will shift after a particular amount of time. This prediction can be used to adjust trim settings to follow the signal shifts over time.

In various embodiments, the indicators of time can be stored in a block information table (BIT). The BIT can also include data identifying the super block as any level cell including: single level cell (SLC), triple level cell (TLC), or quadruple level cell (QLC), amount of valid data in a super block, read counts of each superblock, and/or read counts for each super block. The BIT can be stored in non-volatile memory (e.g., NOR or NAND) and/or volatile memory (e.g., dynamic random-access memory (DRAM)), for example. Prior to turning off the apparatus, the BIT can be copied from volatile memory to non-volatile memory.

FIG. 1 is a diagram of a memory array 102 that includes multiple physical blocks 104-0 (BLOCK 0), 104-1 (BLOCK 1), . . . , 104-B (BLOCK B) and can be operated in accordance with one or more embodiments of the present disclosure. Although not shown in FIG. 1, one of ordinary skill in the art will appreciate that the memory array 102 can be located on a particular semiconductor die along with various peripheral circuitry associated with the operation thereof.

In the example shown in FIG. 1, the indicator "B" is used to indicate that the array 102 can include a number of physical blocks. As an example, the number of physical blocks in array 102 can be 128 blocks, 512 blocks, or 1,024 blocks, but embodiments are not limited to a particular multiple of 128 or to any particular number of physical blocks in an array 102. Further, embodiments are not limited to a type of memory used in the array, e.g., non-volatile, volatile, etc. In the embodiment illustrated in FIG. 1, the memory array 102 can be, for example, a NAND flash memory array 102.

In one more embodiments, a BIT can be stored in the memory array 102. The BIT can include data identifying a super block as any level cell including: single level cell (SLC), triple level cell (TLC), or quadruple level cell (QLC). The BIT can be stored in NOR and/or DRAM, for example. When the memory system is turned off the BIT can be stored in NAND. The BIT in some embodiments, can also store an indicator of time at which a super block is erased, indicator of time at which a first page of the super block is programmed, and an indicator of time at which a last page of the super block is programmed.

In this example, each physical block 104-0, 104-1, . . . , 104-B includes memory cells which can be erased together as a unit, e.g., the cells in each physical block can be erased in a substantially simultaneous manner. For instance, the cells in each physical block can be erased together in a single operation. Each physical block, e.g., 104-0, 104-1, . . . , 104-B, contains a number of physical rows, e.g., 106-0, 106-1, . . . , 106-R, of memory cells coupled to an access line, e.g., a word line. The indicator "R" is used to indicate that a physical block, e.g., 104-0, 104-1, . . . , 104-B, can include a number of rows. In some embodiments, the number of rows, e.g., word lines, in each physical block can be 32, but embodiments are not limited to a particular number of rows 106-0, 106-1, . . . , 106-R per physical block.

As one of ordinary skill in the art will appreciate, each row 106-0, 106-1, . . . , 106-R can store one or more pages of data. A page refers to a unit of programming and/or reading, e.g., a number of cells that are programmed and/or read together or as a functional group of memory cells. In the embodiment shown in FIG. 1, each row 106-0, 106-1, . . . , 106-R stores one page of data. However, embodiments of the present disclosure are not so limited. For instance, in some embodiments of the present disclosure, each row can store multiple pages of data.

In one or more embodiments of the present disclosure, and as shown in FIG. 1, a page associated with the rows 106-0, 106-1, . . . , 106-R can store data in accordance with a number of physical sectors 108-0, 108-1, . . . , 108-S of data. The indicator "S" is used to indicate that a row, e.g., 106-0, 106-1, . . . , 106-R, can include a number of physical sectors. Each physical sector 108-0, 108-1, . . . , 108-S can correspond to a logical sector and can include overhead information, such as error correction code (ECC) information, and logical block address (LBA) information, as well as user data. As one of ordinary skill in the art will appreciate, logical block addressing is a scheme often used by a host for identifying a logical sector of information. As an example, a logical sector can store information representing a number of bytes of data, e.g., 256 bytes, 512 bytes, or 1,024 bytes. Embodiments are not limited to these examples.

It is noted that other formats and/or configurations for the physical blocks 104-0, 104-1, . . . , 104-B, rows 106-0, 106-1, . . . , 106-R, sectors 108-0, 108-1, . . . , 108-S, and pages are possible. For example, the rows 106-0, 106-1, . . . , 106-R of the physical blocks 104-0, 104-1, . . . , 104-B can include a single logical sector which can include, for example, more or less than 512 bytes of data.

Figure 2:
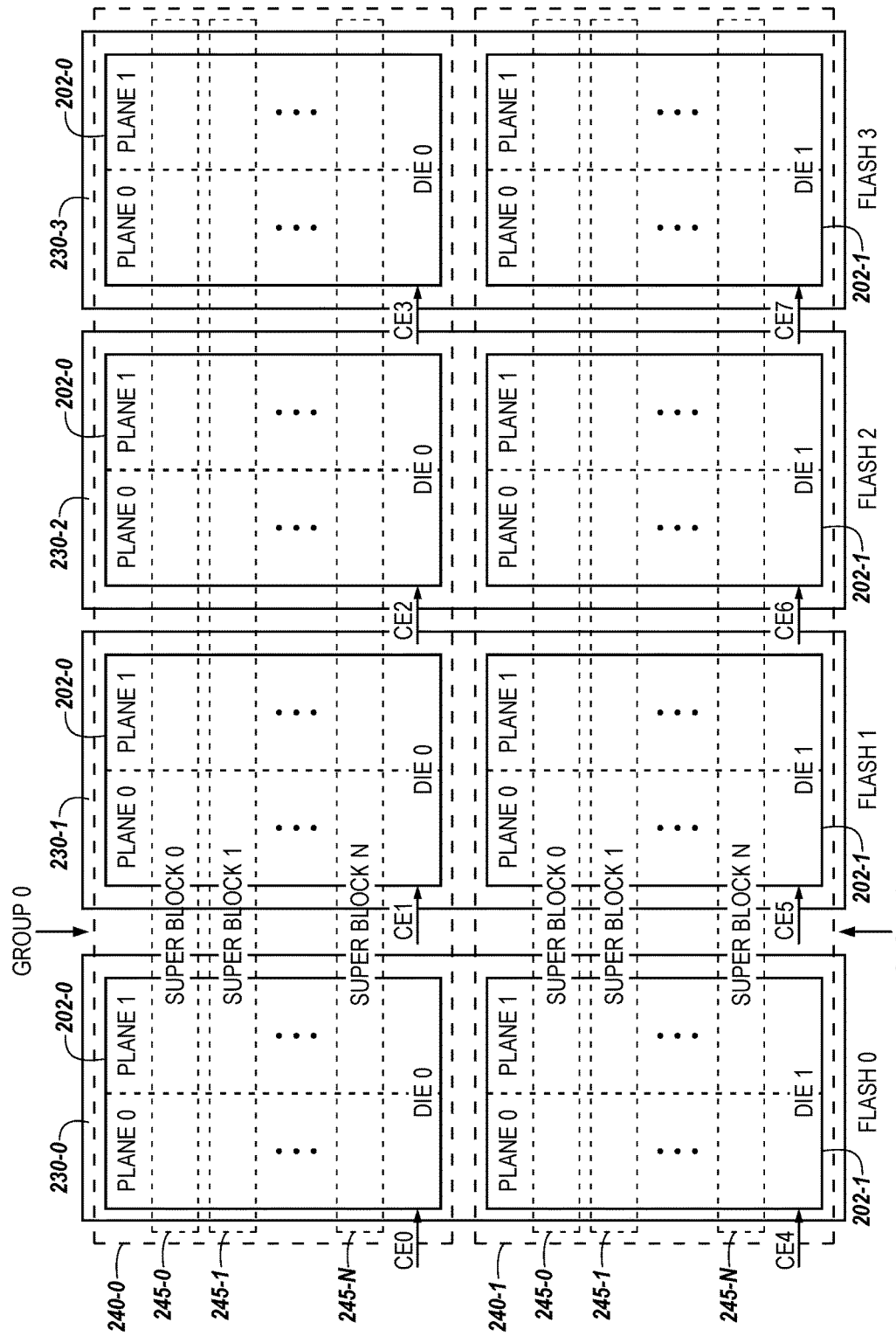
FIG. 2 illustrates an example computing environment including a number of memory devices having multiple groups of planes that can be operated in accordance with one or more embodiments of the present disclosure.

FIG. 2 is a diagram illustrating a number of memory devices having multiple groups of planes that can be operated in accordance with one or more embodiments of the present disclosure. According to one or more embodiments described herein, planes of physical blocks of memory cells are organized into groups for purposes of memory block selection. In one or more embodiments, a group can include a number of planes from one or more different memory arrays. In one or more embodiments, the one or more planes corresponding to a group can be from different memory devices.

The embodiment shown in FIG. 2 includes four memory devices 230-0, 230-1, 230-2, and 230-3. The combination of memory devices 230-0, 230-1, 230-2, and 230-3 can be referred to as a memory unit (e.g., memory unit 325 in FIG. 3). In one or more embodiments, the memory devices 230-0, 230-1, 230-2, and 230-3 form a memory unit of a solid state drive (SSD).

The memory devices 230-0, 230-1, 230-2, and 230-3 can each be a semiconductor memory chip including multiple dies per chip. One of ordinary skill in the art will appreciate that each die on a particular chip can include a memory array along with various peripheral circuitry (not shown in FIG. 2) associated with the operation thereof.

In the embodiment illustrated in FIG. 2, each memory device 230-0, 230-1, 230-2, and 230-3 includes two memory arrays 202-0 and 202-1 (shown as DIE 0 and DIE 1, respectively). Each memory array 202-0 and 202-1 can be a flash memory array such as array (e.g., array 102 in FIG. 1). For instance, each memory array 202-0 and 202-1 includes multiple physical blocks (e.g., memory blocks 104-0, 104-2, . . . , 104-B in FIG. 1) of memory cells.

As one of ordinary skill in the art will appreciate, the physical blocks of an array, e.g., 202-0 and 202-1, can be organized into multiple planes. For instance, in the embodiment illustrated in FIG. 2, each of the memory arrays are divided into a first plane (PLANE 0) of physical blocks and a second plane (PLANE 1) of physical blocks. However, embodiments of the present disclosure are not limited to a particular number of planes per array. For instance, a memory array can include only one plane or can include more than two planes, in various embodiments.

In the embodiment illustrated in FIG. 2, the planes of physical blocks associated with the memory devices 230-0, 230-1, 230-2, and 230-3 are organized into two groups, e.g., 240-0 (GROUP 0) and 240-1 (GROUP 1). In the embodiment illustrated in FIG. 2, each group 240-0 and 240-1 includes each of the planes from each of four memory arrays. For instance, group 240-0 includes the planes (PLANE 0 and PLANE 1) of array 202-0 (DIE 0) within each of the four memory devices 230-0, 230-1, 230-2, and 230-3. group 240-1 includes the planes (PLANE 0 and PLANE 1) of array 202-1 (DIE 1) within each of the four memory devices 230-0, 230-1, 230-2, and 230-3.

Embodiments are not limited to the example shown in FIG. 2. For instance, in one or more embodiments, a group can include a collection of planes within a single array. As an example, one group can include PLANE 0 and PLANE 1 of array 202-0 of device 230-0, another group can include PLANE 0 and PLANE 1 of array 202-1 of device 230-0, and another group can include PLANE 0 and PLANE 1 of array 202-0 of device 230-1.

In some embodiments, a group can include a number of planes within different arrays of a single memory device. As an example, one group can include PLANE 0 of array 202-0 and PLANE 0 of array 202-1 of device 230-0, and another group can include PLANE 1 of array 202-0 and PLANE 1 of array 202-1 of device 230-0. As another example, one group can include PLANE 0 and PLANE 1 of array 202-0 and PLANE 0 and PLANE 1 of array 202-1 of device 230-0, and another group can include PLANE 0 and PLANE 1 of array 202-0 and PLANE 0 and PLANE 1 of array 202-1 of device 230-1.

In embodiments in which the arrays, e.g., 202-0 and 202-1, include multiple planes, a group of planes can, in some embodiments, include one plane from each of one or more arrays of different memory devices. For example, in reference to FIG. 2, in one or more embodiments, each of a number of groups can include a collection of one plane from each of four memory arrays within the four respective memory devices. For instance, one group can include PLANE 0 of array 202-0 (DIE 0) within each of the four memory devices 230-0, 230-1, 230-2, and 230-3. A second group can include PLANE 1 of array 202-0 (DIE 0) within each of the four memory devices 230-0, 230-1, 230-2, and 230-3. A third group can include PLANE 0 of array 202-1 (DIE 1) within each of the four memory devices 230-0, 230-1, 230-2, and 230-3, and a fourth group can include PLANE1 of array 202-1 (DIE 1) within each of the four memory devices 230-0, 230-1, 230-2, and 230-3.

In one or more embodiments, and as illustrated in FIG. 2, the groups 240-0 and 240-1 each have a number of super blocks associated therewith, e.g., SUPER BLOCK 0, SUPER BLOCK 1, . . . , SUPER BLOCK N. As used herein, a super block can refer to a collection of physical blocks that includes a physical block from each plane within a corresponding group. In one or more embodiments, a super block can span across multiple memory devices. For example, a super block can be a collection of physical blocks that includes a physical block from a plane within each of at least two memory arrays within different memory devices within a corresponding group.

Embodiments are not limited to a particular number of super blocks per group. As an example, a group, e.g., 240-0 and 240-1, can include 64, 512, or 1,024 super blocks per group. In the embodiment illustrated in FIG. 2, the super blocks 245-0, 245-1, . . . , 245-N associated with group 240-0 are each a respective collection of physical blocks including a number of physical blocks from each of the four arrays 202-0, e.g., DIE 0 associated with the four respective memory devices 230-0, 230-1, 230-2, and 230-3. Also, the super blocks 245-0, 245-1, . . . , 245-N associated with group 240-1 are each a respective collection of physical blocks including a number of physical blocks from each of the four arrays 202-1, e.g., DIE 1 associated with the four respective memory devices 230-0, 230-1, 230-2, and 230-3.

In one or more embodiments of the present disclosure, a super block can be a collection of one or more physical blocks per plane for each of a number of planes corresponding to a particular group. For instance, in the embodiment illustrated in FIG. 2, each of the super blocks 245-0, 245-1, . . . , 245-N can be a respective collection of eight physical blocks (one block per plane for each array 202-0 of the four different memory devices 230-0, 230-1, 230-2, and 230-3 of the group).

However, in one or more embodiments, a super block does not have to include a physical block from every plane in a given memory array, e.g., 202-0 and 202-1. For instance, in the embodiment illustrated in FIG. 2, each of the super blocks 245-0, 245-1, . . . , 245-N can be a respective collection of four physical blocks, e.g., one block from one of the planes in each array 202-0 of the four different memory devices 230-0, 230-1, 230-2, and 230-3 of the group or one block from one of the planes in each array 202-1 of the four different memory devices 230-0, 230-1, 230-2, and 230-3.

In various embodiments, an erase operation can be performed concurrently on the physical blocks of a super block. That is, the collection of physical blocks of a particular super block can be erased substantially simultaneously. Also, in various embodiments, the pages of physical blocks associated with a particular super block can be concurrently read from and written to. In some examples, an erase operation is not performed concurrently on the physical blocks of a super block. For example, when the super block only has enough power to erase a number of the physical blocks at a time.

Embodiments of the present disclosure are not limited to the example illustrated in FIG. 2. For instance, in one or more embodiments a group can include planes of physical blocks within more or less than four memory arrays. As an example, the embodiment shown in FIG. 2 could be organized into four groups: a first group could include the planes of arrays 202-0 (DIE 0) within memory devices 230-0 and 230-1; a second group could include the planes of arrays 202-0 (DIE 0) within memory devices 230-2 and 230-3; a third group could include the planes of arrays 202-1 (DIE 1) within memory devices 230-0 and 230-1; and a fourth group could include the planes of arrays 202-1 (DIE 1) within memory devices 230-2 and 230-3. In this example, super blocks associated with the four groups could include two physical blocks (one physical block from each of the two arrays associated with the particular group) or could include four physical blocks (one physical block per plane for each of the two arrays associated with the particular group). As an example, a super block of four physical blocks (one physical block per plane for each of the two arrays associated with the particular group) can include 128 pages per physical block and 8 physical sectors per page (assuming 4 KB pages), for a total of 4,096 physical sectors per super block. In this example, a LBA range of 4,096 addresses can be mapped to a particular 4,096 sector physical super block. However, embodiments of the present disclosure are not limited to a particular page size, sector size, and/or physical block size. For instance, embodiments are not limited to a particular number of sectors per super block.

In one or more embodiments, the physical blocks within a particular super block, e.g., 245-0 to 245-N, can have different block position numbers. That is, the physical blocks within a particular super block can be located at different locations within the planes corresponding to a given group, e.g., 240-0 and 240-1. As one example, consider the physical blocks corresponding to super block 245-0 of group 240-0. The collection of physical blocks corresponding to super block 245-0 can include physical blocks located near a top portion of array 202-0 of device 230-0 and can include physical blocks located near the middle or lower portion of the arrays 202-0 of devices 230-1, 230-2, and 230-3.

Figure 3:
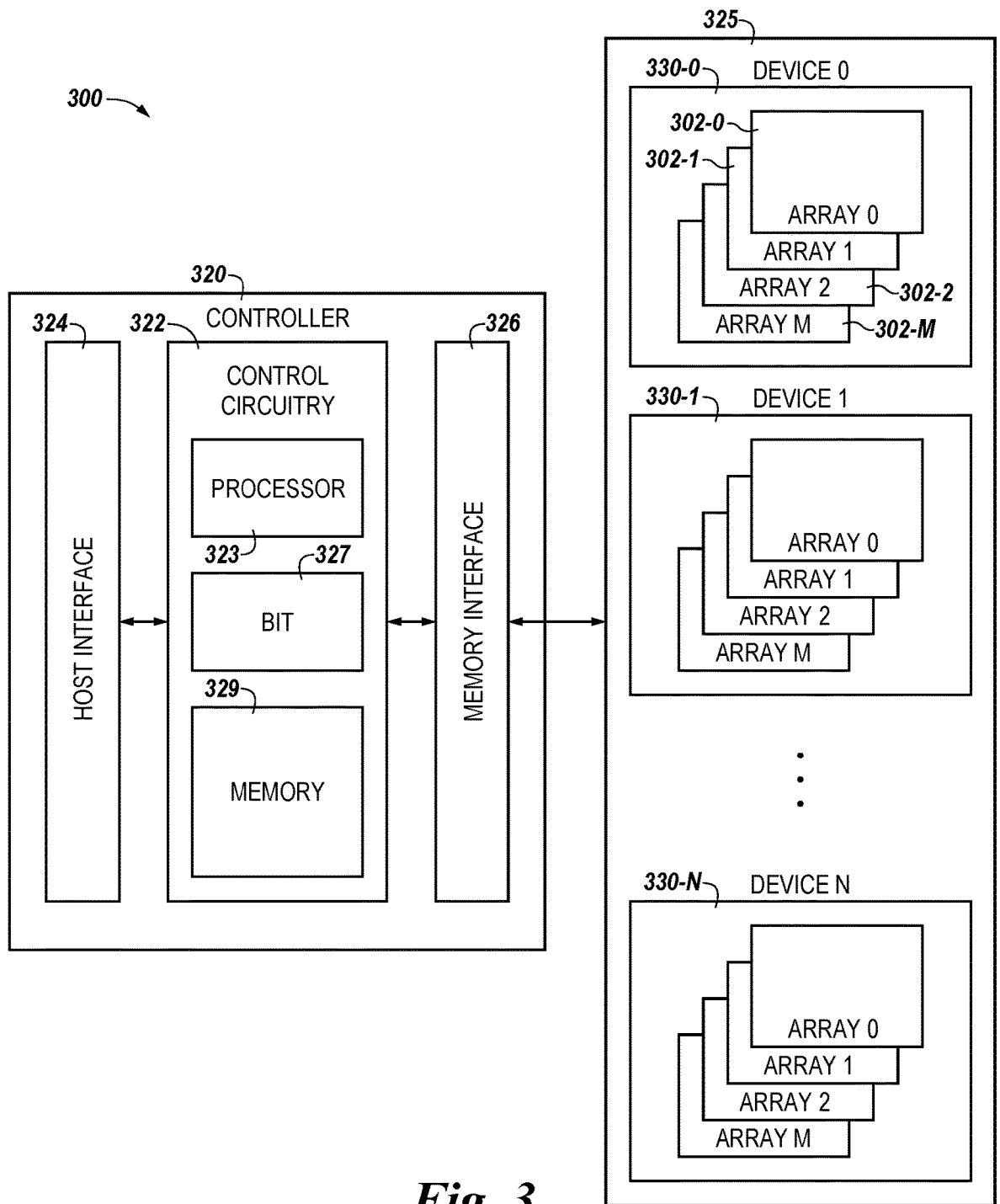
FIG. 3 is a block diagram of an example memory system in accordance with one or more embodiments of the present disclosure.

FIG. 3 is a block diagram of a memory system 300 in accordance with one or more embodiments of the present disclosure. In one or more embodiments, the system 300 is a solid state drive. That is, the embodiment of FIG. 3 can illustrate the components and architecture of one embodiment of a solid state drive 300. In the embodiment illustrated in FIG. 3, the system 300 includes a controller 320, a host interface 324, a memory interface 326, and solid state memory unit 325.

In the embodiment illustrated in FIG. 3, the memory unit 325 includes a number of memory devices 330-0, 330-1, . . . , 330-N. As an example, the memory devices can be non-volatile memory devices such as flash memories, e.g., NAND flash or NOR flash devices, among others. The memory devices 330-0, 330-1, ..., 330-N can be memory devices such as memory devices 230-0, 230-1, 230-2, and 230-3 described in connection with FIG. 2. Although not shown in FIG. 3, in one or more embodiments, each of the memory devices 330-0, 330-1, ..., 330-N can be associated with a particular channel of the SSD 300. That is, the system 300 can be a multi-channel system.

In one or more embodiments, and as illustrated in FIG. 3, each of the memory devices 330-0, 330-1, ..., 330-N includes a number of memory arrays 302-0, 302-1, 302-3, ..., 302-M. The memory arrays 302-0, 302-1, 302-3, ..., 302-M can be arrays such as memory array102 described in connection with FIG. 1 or memory arrays 202-0 and 202-1 described in connection with FIG. 2. For instance, each of the memory arrays 302-0, 302-1, 302-3, ..., 302-M can include multiple physical blocks of memory cells. In one or more embodiments, each of the memory arrays 302-0, 302-1, 302-3, ..., 302-M can represent a single die, and each of the memory devices 330-0, 330-1, ..., 330-N can represent a memory chip having multiple dies per chip.

In one or more embodiments, the planes of physical blocks of memory cells within memory unit 325 can be organized into multiple groups as described above in connection with FIG. 2. For instance, the groups can have a number of super blocks associated therewith. The super blocks can be respective collections of physical blocks with each collection including a physical block from multiple planes corresponding to the group.

As illustrated in FIG. 3, the memory unit 325 can be coupled to the controller 320 via a memory interface 326. The memory interface 326 can be used to communicate information between the memory unit 325 and the controller 320. The controller 320 can be coupled to a memory access device, e.g., a processor of a host device (not shown), via host interface 324. A host device can include a computing device such as a personal computer (PC), a laptop computer, a digital camera, a media player, or a cellular telephone, among various other computing devices. As an example, when the memory unit 325 is used for data storage in a computing device, as illustrated in FIG. 3, the host interface 324 can be a serial advanced technology attachment (SATA), among others, e.g., the controller 320 can be a SATA controller or a USB controller, among others. That is, embodiments are not limited to a particular type of controller 320 and/or host interface 324.

In one or more embodiments, and as illustrated in FIG. 3, the controller 320 includes control circuitry 322. The control circuitry 322 can include a processor 323, a block information table (BIT) 327, a memory 329 (e.g., DRAM, SRAM, etc.), among other control circuitry (not shown) for operation of memory system 300. In one or more embodiments, the controller 320 is used to write data to and read data from the memory unit 325.

In one or more embodiments, the BIT 327 can store an indicator of time at which a super block is erased, indicator of time at which a first page of the super block is programmed, and an indicator of time at which a last page of the super block is programmed. The BIT 327 can also include data identifying the super block as any level cell including: single level cell (SLC), triple level cell (TLC), or quadruple level cell (QLC). The BIT 327 can be stored in NOR and/or DRAM, for example. When the memory system is turned off the BIT 327 can be stored in NAND.

Figures 4, 5:
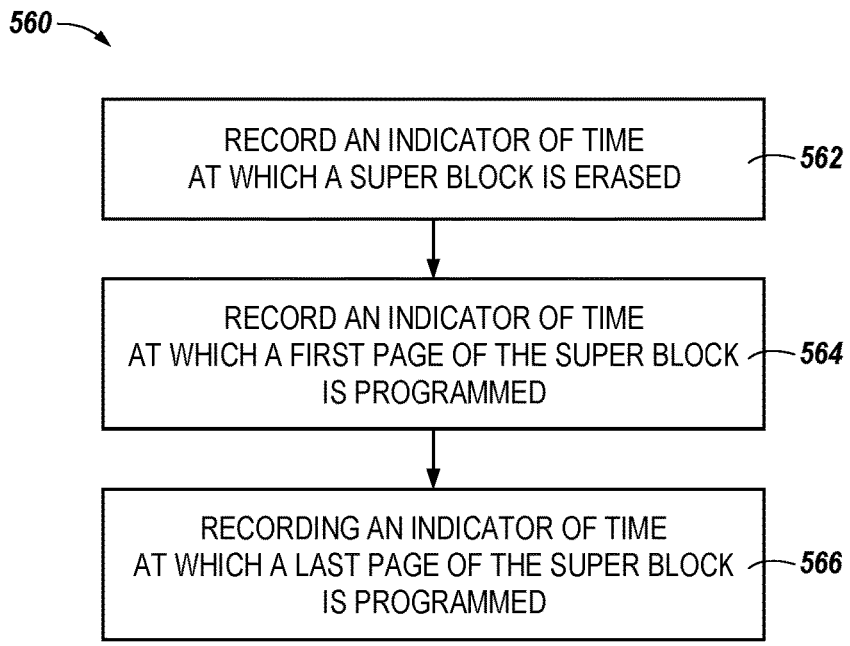
FIG. 4 is a block information table in accordance with a number of embodiments of the present disclosure.
FIG. 5 is a flow diagram of an example method to record an indicator of time at which super blocks are erased and programmed in accordance with one or more embodiments of the present disclosure.

FIG. 4 is a block information table (BIT) 440 in accordance with a number of embodiments of the present disclosure.

As shown in FIG. 4, the BIT 440 can include a super block indicator column 404, an erased column 442, a first page programmed column 444, and a last page programmed column 446. The block number column 404 can include a super block indicators. For example, super block 0 445-0, super block 1 445-1, and super block N 445-N.

The erased column 442 can include erase indicators 448-1, ..., 448-W. Erase indicators 448-1, ..., 448-W can be indicators of time at which super blocks were erased. The first page programmed column 444 can include first page program indicators 450-1, ..., 450-X. The first page program indicators 450-1, ..., 450-X can be indicators of time at which a first page of a super blocks was programmed. The last page programmed column 446 can include last page program indicators 452-1, ..., 452-Y. The last page program indicators 452-1, ..., 452-Y can be indicators of time at which the last page of a super blocks was programmed. The indicator of time at which a super block is erased, a first page of a super block is programmed, and a last page of a super block is programmed can be recorded. The indicator of time can be a power on hour (POH), power on cycle, and/or real time. In a number of embodiments, the real time can be received from a clock in the apparatus. The indicator of time can be used for failure analysis and/or adjusting trim settings.

Failure analysis can be done after the memory system (e.g., memory system 300) has failed. The failure analysis is not limited to, but can include calculating how long the super block was in an erased state before being programmed. The failure analysis can also include calculating how long the super block was in a programmed state before failing.

Adjusting trim settings can be performed on a memory system (e.g., memory system 300) while in use. Adjusting trim settings is not limited to, but can include increasing and/or decreasing the frequency of background scans, adjusting voltage levels, current levels, read algorithms, and read levels, in response to one or more of the indicators of time. The one or more indicators of time can also be used to predict where signals of a super block will shift after a particular amount of time. Trim settings can be adjusted to follow the signal shifts over time.

FIG. 5 is a flow diagram of an example method 560 to record an indicator of time at which super blocks are erased and programmed in accordance with one or more embodiments of the present disclosure. Method 560 can be performed by processing logic that can include hardware (e.g., circuitry, dedicated logic, programmable logic, microcode, etc.), software (such as instructions run on a processing device), firmware, or a combination thereof. In one embodiment, the memory system (e.g., memory system 300) can perform method 560. Although shown in a particular sequence or order, unless otherwise specified, the order of the processes can be modified. Thus, the illustrated implementations should be understood only as examples, and the illustrated processes can be performed in a different order, and some processes can be performed in parallel. Additionally, one or more processes can be omitted in various embodiments. Thus, not all processes are required in every implementation. Other process flows are possible.

At block 562, the controller (e.g., controller 320 in FIG. 3) records an indicator of time at which a super block is erased. In some embodiments, the indicator of time at which a super block is erased can be stored in a block information table (BIT). The indicator of time can be recorded in, for example, a power on hour (POH), power on cycle, real time, or any combination of such.

At block 564, the controller (e.g., controller 320 in FIG. 3) records an indicator of time at which a first page of the super block is programmed.

At block 566, the controller (e.g., controller 320 in FIG. 3) records an indicator of time at which a last page of the super block is programmed.

Figure 6:
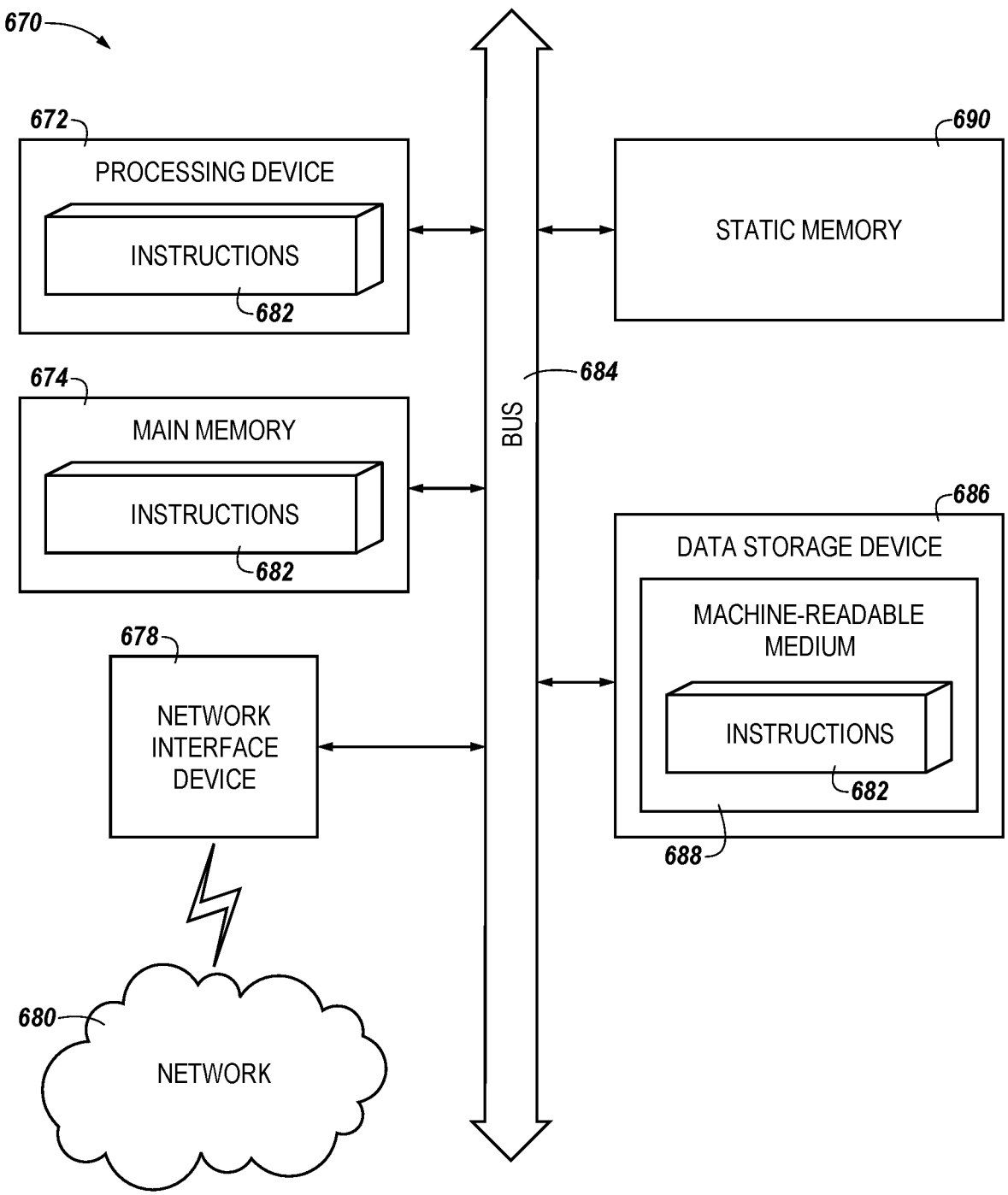
FIG. 6 illustrates an example machine of a computer system 670 within which a set of instructions, for causing the machine to perform any one or more of the methodologies discussed herein, may be executed.

FIG. 6 illustrates an example machine of a computer system 670 within which a set of instructions, for causing the machine to perform any one or more of the methodologies discussed herein, may be executed. For example, the computer system 670 may correspond to a host that includes or utilizes a memory system (e.g., the memory system 300 of FIG. 3) or may be used to perform the operations of a controller (e.g., to store an indictor of time in a BIT (e.g., BIT 327 in FIG. 3)). In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein. The example computer system 670 includes a processing device 672, a main memory 674 (e.g., read-only memory (ROM), flash memory, dynamic random access memory (DRAM) such as synchronous DRAM (SDRAM) or Rambus DRAM (RDRAM), etc.), a static memory 690 (e.g., flash memory, static random access memory (SRAM), etc.), and a data storage device 696, which communicate with each other via a bus 684.

Processing device 672 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 672 is configured to execute instructions 682 for performing the operations and steps discussed herein. The computer system 670 may further include a network interface device 678 to communicate over the network 680.

The data storage device 686 may include a machine-readable storage medium 688 (also known as a computer-readable medium) on which is stored one or more sets of instructions or software 682 embodying any one or more of the methodologies or functions described herein. The instructions 682 may also reside, completely or at least partially, within the main memory 674 and/or within the processing device 672 during execution thereof by the computer system 670, the main memory 674 and the processing device 672 also constituting machine-readable storage media. The machine-readable storage medium 688, data storage device 686, and/or main memory 674 may correspond to the memory system 300 of FIG. 3.

In one implementation, the instructions 682 include instructions to implement functionality corresponding to a programming component (e.g., BIT 327 of FIG. 3). While the machine-readable storage medium 688 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, aspects of the present disclosure may refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method, comprising:
   recording an indicator of time at which a super block is erased;
   recording an indicator of time at which a first page of the super block is programmed;
   recording an indicator of time at which a last page of the super block is programmed; and
   predicting where signals of the super block will shift after an amount of time in response to one or more of the indicators of time and an initial state of the super block.

2. The method of claim 1, wherein recording the indicator of time at which the super block is erased, the indicator of time at which the first page of the super block is programmed, and the indicator of time at which the last page of the super block is programmed includes recording a power on hour (POH) at which the super block is erased, recording a POH at which the first page of the super block is programmed, and recording a POH at which the last page of the super block is programmed.

3. The method of claim 1, wherein recording the indicator of time at which the super block is erased, the indicator of time at which the first page of the super block is programmed, and the indicator of time at which the last page of the super block is programmed includes recording a power on cycle at which the super block is erased, recording a power on cycle at which the first page of the super block is programmed, and recording a power on cycle at which the last page of the super block is programmed.

4. The method of claim 1, wherein recording the indicator of time at which the super block is erased, the indicator of time at which the first page of the super block is programmed, and the indicator of time at which the last page of the super block is programmed includes recording real time at which the super block is erased, recording real time at which the first page of the super block is programmed, and recording real time at which the last page of the super block is programmed.

5. The method of claim 1, further including using the indicator of time at which the super block is erased, the indicator of time at which the first page of the super block is programmed, and the indicator of time at which the last page of the super block is programmed for failure analysis.

6. A method, comprising:
   storing an indicator of a power on hour (POH) at which a super block is erased;
   storing an indicator of a POH at which a first page of the super block is programmed;
   storing an indicator of a POH at which a last page of the super block is programmed; and calculating how long the super block is in a programmed state before failing using one or more of the indicators of the POHs.

7. The method of claim 6, wherein a block information table (BIT) stores the POH at which super block is erased, the POH at which the first page of the super block is programmed, and the POH at which the last page of the super block is programmed.

8. The method of claim 7, wherein the BIT is stored in non-volatile memory.

9. The method of claim 7, wherein the BIT includes data identifying the super block as including single level cells (SLC), triple level cells (TLC), or quadruple level cells (QLC).

10. The method of claim 6, further includes calculating how long the super block was in an erased state before being programmed.

11. The method of claim 6, further includes calculating how long the super block was in the programmed state before failing for failure analysis.

12. An apparatus, comprising:
    a memory array; and
    a controller coupled to the memory array, wherein the controller is configured to:
       store an indicator of a time at which a super block is erased in a block information table (BIT);
       store an indicator of a time at which a first page of the super block is programmed in the BIT;
       store an indicator of a time at which a last page of the super block is programmed in the BIT; and
       adjust background scans of the memory array in response to one or more of the indicators of time.

13. The apparatus of claim 12, wherein the controller is further configured to adjust trim settings of the memory array, in response to one or more of the indicators of time.

14. The apparatus of claim 12, wherein the controller is further configured to erase a portion of the memory array before writing to the portion of the memory array, in response to one or more of the indicators of time.

15. The apparatus of claim 12, wherein the controller is further configured to predict where signals of a super block will shift after an amount of time, in response to one or more of the indicators of time and an initial state of the super block.

16. The apparatus of claim 12, wherein the controller is further configured to receive a real time.

17. An apparatus, comprising:
    a memory array; and
    a controller coupled to the memory array, wherein the controller is configured to:
       update a block information table (BIT), wherein the BIT includes a power on hour (POH) at which each super block of a number of super blocks is erased, a POH at which each first page of the number of super blocks is programmed, and a POH at which each last page of the number of super blocks is programmed; and calculate how long each of the number of super blocks is in a programmed state before failing using one or more of the POHs.

18. The apparatus of claim 17, wherein the controller is further configured to save the BIT in non-volatile memory.

19. The apparatus of claim 17, wherein the controller is further configured to save the BIT in volatile memory.

20. The apparatus of claim 18, wherein the controller is further configured to copy the BIT from volatile to non-volatile memory prior to the apparatus being turned off.

* * * * *